United States Patent
Balmori Labra et al.

(10) Patent No.: US 9,292,360 B2
(45) Date of Patent: Mar. 22, 2016

(54) CROSS-PLATFORM APPLICATION PROGRAMMING INTERFACES FOR APPLICATIONS

(71) Applicant: Microsoft Technology Licensing, LLC, Redmond, WA (US)

(72) Inventors: Juan Gabriel Balmori Labra, Redmond, WA (US); Mark Brewster, Seattle, WA (US); Zhenyu Tang, Sammamish, WA (US); Rolando Jimenez-Salgado, Redmond, WA (US); Lawrence Fubini Waldman, Seattle, WA (US); Joseph Wai-Yan Woo, San Francisco, CA (US); Shahar Prish, Redmond, WA (US); Keyur Patel, Seattle, WA (US); Andrew Salamatov, Seattle, WA (US); David Claux, Redmond, WA (US); Jason Todd Henderson, Tacoma, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/449,829

(22) Filed: Aug. 1, 2014

(65) Prior Publication Data

US 2014/0344838 A1    Nov. 20, 2014

Related U.S. Application Data

(63) Continuation of application No. 13/295,741, filed on Nov. 14, 2011, now Pat. No. 8,881,179.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |

(Continued)

(52) U.S. Cl.
CPC .............. *G06F 9/54* (2013.01); *G06F 9/44526* (2013.01); *G06F 17/30106* (2013.01)

(58) Field of Classification Search
None
See application file for complete search history.

(56) References Cited

U.S. PATENT DOCUMENTS

| | | | |
|---|---|---|---|
| 7,444,620 B2 | 10/2008 | Marvin | |
| 8,249,885 B2 * | 8/2012 | Berkowitz | ........ G06F 17/30873 705/1.1 |

(Continued)

OTHER PUBLICATIONS

"Using XML in ASP.net" Published on: Aug. 24, 2011, Available at: http://www.beansoftware.com/ASP.NET-Tutorials/Using-XML.aspx, 7 pages.

(Continued)

*Primary Examiner* — Craig Dorais
(74) *Attorney, Agent, or Firm* — Julie Kane Akhter; Danielle Johnston Holmes; Micky Minhas (57) ABSTRACT

Concepts and technologies are described herein for cross-platform application programming interfaces for applications. In accordance with the concepts and technologies disclosed herein, the cross-platform APIs support interoperability and extensibility with various application programs using a single language and/or set of APIs. Extensions authored for a particular application program may be used with other application programs that expose the same or a similar set of APIs, even if other object models or APIs associated with the application programs differ from one another. Thus, the APIs support cross-platform, cross-device, and cross-version compatibility of extensions.

18 Claims, 5 Drawing Sheets

(51) Int. Cl.
*G06F 9/54* (2006.01)
*G06F 9/445* (2006.01)
*G06F 17/30* (2006.01)

(56) References Cited

U.S. PATENT DOCUMENTS

| | | | | |
|---|---|---|---|---|
| 2004/0073871 | A1* | 4/2004 | Giannetti | G06F 17/3089 715/201 |
| 2005/0179705 | A1 | 8/2005 | Ubillos et al. | |
| 2006/0129979 | A1* | 6/2006 | Fernando | G06F 9/46 717/113 |
| 2008/0131019 | A1* | 6/2008 | Ng | G06T 5/001 382/255 |
| 2009/0234844 | A1* | 9/2009 | Kaehler | G06F 9/546 |
| 2009/0271771 | A1* | 10/2009 | Fallows | G06F 9/45516 717/137 |
| 2010/0138844 | A1* | 6/2010 | Mager | G06F 21/6218 719/328 |
| 2011/0035742 | A1 | 2/2011 | Shenfield | |

OTHER PUBLICATIONS

Danner, J. "Persisting Application Settings in the .NET Framework," Published on: Jun. 2002, Available at: http://msdn.microsoft.com/en-us/library/ms973902.aspx, 15 pages.

Lloyd, J. "The OpenDoc Development Framework," Published on: Aug. 24, 2011 Available at: http://www.mactech.com/articles/mactech/Vol.11/11.11/OpenDocFramework/index.html, 3 pages.

"ActionScript® 3.0 Reference for the Adobe® Flash® Platform," Published on: Aug. 24, 2011, Available at: http://help.adobe.com/en_US/FlashPlatform/reference/actionscript/3/flash/filesystem/File.html, 60 pages.

Foley, M. "Microsoft to Focus on HTML5 and JavaScript for Office 15 Extensions," Published on: Aug. 3, 2011, Available at: http://www.zdnet.com/blog/microsoft/microsoft-to-focus-on-html5-and-javascriptfor-office-15-extensions/10266, 2 pages.

"Developing Applications for Lotus Expeditor 6.2.2," Published on: Jul. 2010, 7th Edition, IBM Corp., Available at: http://infolib.lotus.com/resources/expeditor/6.2.2/doc/le622abd010/en_us/ExpeditorDevelopers.html, 546 pages.

"Static, Shared Dynamic and Loadable Linux Libraries," Published on: Aug. 24, 2011 Available at: http://www.yolinux.com/TUTORIALS/LibraryArchives-StaticAndDynamic.html, 9 pages.

U.S. Official Action dated Oct. 24, 2013 in U.S. Appl. No. 13/295,741.

U.S. Notice of Allowance dated Apr. 14, 2014 in U.S. Appl. No. 13/295,741.

* cited by examiner

CROSS-PLATFORM APPLICATION PROGRAMMING INTERFACES FOR APPLICATIONS

CROSS REFERENCE TO RELATED APPLICATIONS

This patent application is a continuation of U.S. application Ser. No. 13/295,741, now U.S. Pat. No. 8,881,179, entitled "Cross-Platform Application programming Interfaces for Applications", which was filed Nov. 14, 2011 and which is expressly incorporated herein in its entirety by reference.

BACKGROUND

Application developers wanting to create software add-ons, plug-ins, or other extensions for a particular software package may be confronted with multiple platforms and object models associated with the software. For example, a software developer may distribute the software for use on multiple computing platforms and/or operating systems. For example, a software developer may create an extension for a PC version of the Microsoft Office family of products from Microsoft Corporation in Redmond, Wash. Users of another version of the Microsoft Office family of products may be unable to use the extension. In particular, because the operating systems and/or platforms may be distinct from one another, an extension authored for a particular platform may be incompatible with software executed on another platform.

Furthermore, when new versions of a particular software package are developed, some changes made to the software package may result in a loss of compatibility between the extension and the software package. For example, some aspects of a software object model may evolve between versions. As a result, developers may be compelled to create multiple versions of the extension for compatibility for new versions of software.

Some software suites, while related in some aspects, may include distinct application-specific object models. With regard to the Microsoft Office family of products, for example, the Microsoft Word word processing application has a first object model and set of APIs while the Microsoft Excel spreadsheet application has a second object model and set of APIs for use by developers. As such, developers may create various versions of a particular extension, even for related applications of software packages. The various versions of the extensions may use application-specific application programming interfaces ("APIs") to interact with the application programs. Thus, even when developing extensions for related software or applications, application developers who have created an extension for one application platform may eventually recode the extension using another application-specific API for compatibility with other applications.

It is with respect to these and other considerations that the disclosure made herein is presented.

SUMMARY

Concepts and technologies are described herein for cross-platform application programming interfaces ("APIs") for applications. In accordance with the concepts and technologies disclosed herein, the cross-platform APIs support interoperability and extensibility with various application programs using a single set of APIs. In some embodiments, the APIs support JAVASCRIPT for interacting with the application programs. The APIs can allow extensions to function over various platforms including rich clients, web-access clients, server computers, and the like. As such, resistance to new versions of application programs by application developers may be reduced.

Similarly, because the APIs support interactions with one or more application programs using a single language and/or set of APIs, extensions authored for a particular application program may be used with other application programs that expose the same or a similar set of APIs. As such, the APIs support cross-platform, cross-device, and cross-version compatibility of extensions. The APIs are configured, by design, to abstract away certain differences or distinctions between the manner in which various application programs interact with files, thereby allowing extensions to function with files across multiple application programs.

According to one aspect, a computing device executes application programs that are configured to expose a set of APIs. The APIs can be used to initialize an extension configured to interact with a file associated with the application programs. The file can be any type of file including, but not limited to, word processing documents, spreadsheet documents, calendar files, email files, contact information, databases, presentation documents, project documents and the like. The APIs are configured to determine if a portion of the document is selected, and to perform various operations with respect to the selected portions.

According to another aspect, the APIs support a notion referred to herein as "binding." Binding as used herein refers to creating an association or relationship between an extension and a portion of a document such as a table, paragraph, an image, or the like. Data from a selection of the file can be written to the bound section and/or data from a bound section of the file can be written to a selection of the file. As such, the APIs support selection-based and binding-based access and manipulation of data. As such, an extension or other application calling the binding may function only with an awareness that it is working with a binding. As such, the APIs disclosed herein provide a layer of abstraction via the notion of bindings. This layer of abstraction is created between the calling application and the content application and can facilitate symmetry across content types and/or applications.

According to some embodiments, the APIs also support coercing data into a recognized data type. The data types supported by the APIs can be consistent across applications, versions, and platforms. Settings associated with the extensions can be stored and retrieved when extensions are initialized or activated. The APIs also support multi-user interactions with application programs, interactions with extensible markup language ("XML") parts, interactions and/or operations on custom XML parts such as Office Open XML ("OOXML") parts, and synchronous and asynchronous operations. The APIs also can support operations that include use of the APIs as well as other application-specific and/or objet-model-specific APIs that are tailored to core functionality of the application programs.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for cross-platform application programming interfaces for applications. According to the concepts and technologies described herein, the cross-platform APIs support interoperability and extensibility with various application programs using a single set of APIs. In some embodiments, the APIs support JAVASCRIPT for interacting with the application programs. The APIs can allow extensions to function over various platforms including rich clients, web-access clients, server computers, and the like.

The APIs also can support interactions with one or more application programs using a single language and/or set of APIs. As such, extensions authored for a particular application program may be used with other application programs that expose the same or a similar set of APIs, even if other object models or APIs associated with the application programs differ from one another. Thus, the APIs support cross-platform, cross-device, and cross-version compatibility of extensions. In some embodiments, the APIs are configured to minimize differences or distinctions between the manner in which various application programs interact with files. Thus, some embodiments of the concepts and technologies disclosed herein allow extensions to function with files across multiple application programs.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for cross-platform application programming interfaces for applications will be presented.

Figure 1:
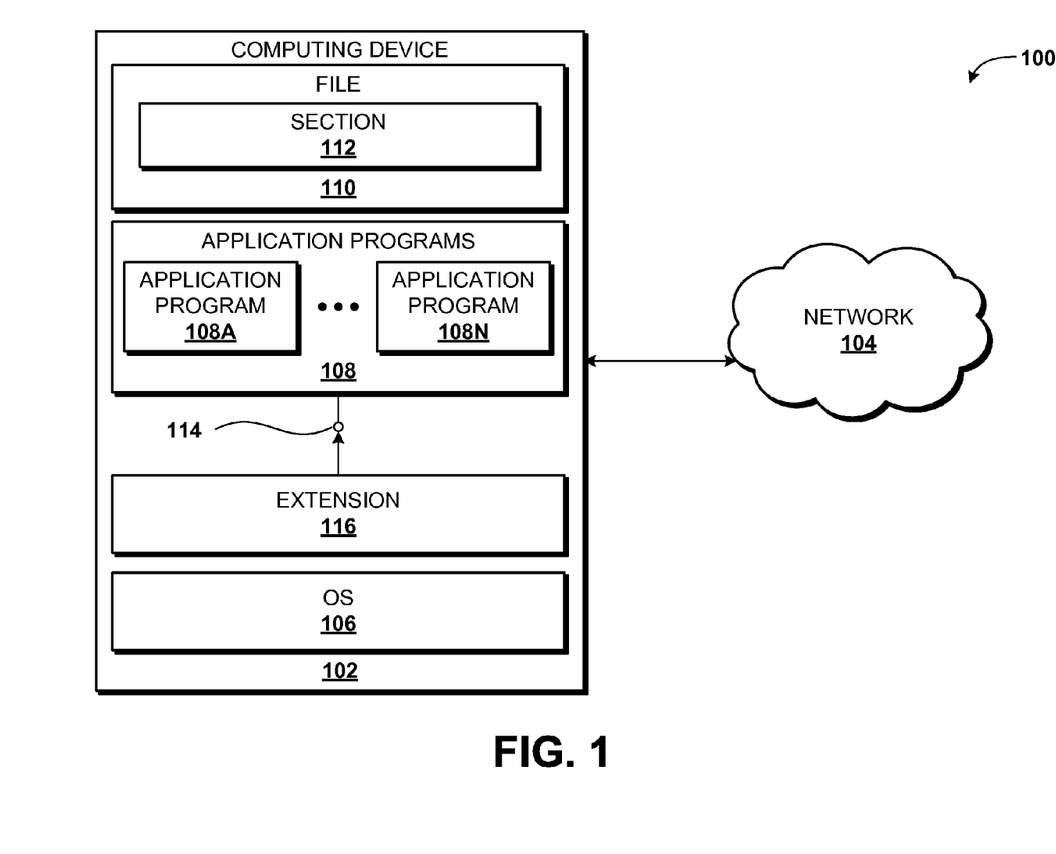
FIG. 1 is a system diagram illustrating an illustrative operating environment for the various embodiments disclosed herein.

Referring now to FIG. 1, aspects of one operating environment 100 for the various embodiments presented herein will be described. The operating environment 100 shown in FIG. 1 includes a computing device 102. According to various embodiments, the functionality of the computing device 102 is provided by a personal computer ("PC") such as a desktop, tablet, or laptop computer system; a server computer; a mobile computing device such as a handheld computer, a tablet computer; or another type of computing device. In some embodiments, the computing device 102 is configured to operate as part of, or in communication with, a communications network ("network") 104, though this is not necessarily the case. The network 104 can include any type or combination of communications networks. Because the computing device 102 can operate in a stand-alone computing environment, it should be understood that the embodiment shown in FIG. 1 is illustrative, and should not be construed as being limiting in any way.

The computing device 102 is configured to execute an operating system 106 and one or more application programs 108A-N (hereinafter collectively and/or generically referred to as "application programs 108"). The operating system 106 is a computer program for controlling the operation of the computing device 102. The application programs 108 are executable programs configured to execute on top of the operating system 106 to provide any type of functionality for users of the computing device 102 and/or to further control operation of the computing device 102. In some embodiments, for example, the application programs 108 include one or more, or a suite, of application programs. For example, in one contemplated embodiment of the computing device 102, the application programs 108 include one or more members of the MICROSOFT OFFICE family of products from Microsoft Corporation in Redmond, Wash. The application programs 108 also can include any combination of web browsers, customer relationship management software, personal information management software, other application programs, combinations thereof, and the like.

For purposes of illustrating the concepts and technologies disclosed herein, the application programs 108 will be described as including a member of the MICROSOFT OFFICE family of products as described above. As described herein, the application programs 108 can create, save, modify, and/or perform operations on one or more documents or other files (hereinafter collectively and/or generically referred to as "files") 110. In the illustrated embodiments, the file 110 can include a MS WORD document file; an MS EXCEL spreadsheet file; an MS OUTLOOK calendar, mail, note, or contact file; an MS POWERPOINT presentation file; an MS ACCESS database file; and/or another type of file or document. Because the concepts and technologies disclosed herein can be used with any type of software, it should be understood that these embodiments of the application programs 108 and the file 110 are illustrative, and should not be construed as being limiting in any way.

The file 110 includes one or more portions or sections ("section") 112. According to various implementations, the section 112 includes a selection within and/or a portion of the file 110 such as, for example, a table, a string of text, a paragraph, a page, a slide, a worksheet, or other portion of the file 110. The section 112 can include a portion of the file 110 being interacted with by a user and/or the application programs 108. The section 112 can include any portion of, or the entire, file 110 and can be interacted with using various aspects of the concepts and technologies disclosed herein.

In various implementations of the concepts and technologies disclosed herein, the application programs 108 executed by the computing device 102 are configured to expose one or more, or a set of, application programming interfaces ("APIs") 114. The APIs 114 are exposed by the application programs 108 to allow users or other software to interact with the application programs 108. In some embodiments, the APIs 114 allow interactions with the application programs 108 by other software such as, for example, plug-ins, add-ons, extensions, or other software (hereinafter collectively and/or generically referred to as "extensions") 116. According to various embodiments, the APIs 114 are used by application developers to create the extensions 116 such that the extensions 116 can interact with the application programs 108, can support interactions with the application programs 108 by external resources or computing devices via the network 104, and/or can enable other functionality as described herein. As shown in FIG. 1, it should be understood that the extensions 116 can access one or more of the application programs 108 via the same set of APIs 114.

According to implementations of the concepts and technologies disclosed herein, the APIs 114 exposed by the application programs 108 are configured to allow developers to create cross-platform, cross-application, and cross-version functionality for the application programs 108 and/or the extensions 116. In one embodiment, the APIs 114 are configured to recognize commands and/or functionality across a combination of software applications that are included within or as part of the application programs 108. For example, as mentioned above, the MICROSOFT OFFICE family of application programs can include, but is not limited to, a member of the MICROSOFT OUTLOOK family of personal information management ("PIM") software, a member of the MICROSOFT WORD family of word processing software, a member of the MICROSOFT EXCEL family of spreadsheet software, a member of the MICROSOFT POWERPOINT family of presentation software, a member of the MICROSOFT ACCESS family of database software, all from Microsoft Corporation in Redmond Wash. The MICROSOFT OFFICE family of products can include additional or alternative software in some embodiments.

In some implementations, each of the software applications included in the MICROSOFT OFFICE family of products can expose an application-specific API and/or object model ("OM") for interacting therewith. Thus, developers can tailor add-ons, extensions, and/or other software using application-specific APIs. The ability to script or code custom extensions using an application-specific API can result in extensions that are tailored specifically for the core functionality of a particular program. As such, the extensions 116 can be tightly bound to the OM of a particular application program 108. The extensions 116, however, may be so tightly tied to the application program 108 that developers may create new versions of the extensions 116 when new versions of the application programs 108 are released. Similarly, developers wishing to support functionality across more than one of the application programs 108; across more than one platform executing the application programs 108; and/or across multiple versions of the application programs 108 may create multiple versions of the extensions 116. In one contemplated embodiment, at least two versions of the application programs 108 are sold by vendors, a first version for use by a first platform executing a member of the WINDOWS family of operating systems from Microsoft Corporation in Redmond, Wash., and a second version for use by a second platform executing an alternative operating system. It should be understood that this embodiment is illustrative, and should not be construed as being limiting in any way.

According to various implementations, the concepts and technologies disclosed herein provide APIs 114 that support cross-platform, cross-application, and cross-version functionality for extensions 116. In one embodiment, the APIs 114 provide a JAVASCRIPT-based environment for interacting with the application programs 108. The example of JAVASCRIPT is illustrative, as other languages can be used. In one implementation, the APIs 114 support web extension initialization functionality for the application programs 108. For example, the APIs 114 exposed by the application programs 108 can expose an extension object that enables a developer to implement various delegates without having specific knowledge of the type of application supporting the APIs 114. In one contemplated embodiment, the delegates include an initialize delegate that gives access to an Context object. The initialize delegate can be defined in a JAVASCRIPT file. In one implementation, wherein the application programs 108 correspond to a member of the MICROSOFT OFFICE family of products, the delegate is defined in an Office.js file. The Context object provides access to the environment in which an extension 116 is running, namely, the Application object, the Document, or the Settings object. These and other aspects of the Context object are described in more detail below. It should be understood that this embodiment is illustrative, and should not be construed as being limiting in any way.

A developer can use the Context object to access a full object model of the application programs 108. A developer also can access document contents of a document or other file 110 with which the initialized web extension or other extension 116 is interacting. In one embodiment, a document property of the Context object is used to access the file 110. Additionally, the initialize function provides a reason parameter that can be used to specify a reason for the initialization. The developer can use the reason parameter to implement reason-specific logic. For example, one type of logic can be implemented when the web extension is inserted, and a second type of logic can be implemented if the web extension pre-exists on the document, for example, if a user opens a document and an extension is saved already. One contemplated example of implementing the web extension initialization functionality of the APIs 114 is described in more detail below with reference to FIG. 2.

Through the initialization function, developers can obtain access to an application object that represents the application program 108 being used at the computing device 102. For example, the application object provides, in one embodiment, name and version properties. The name and version properties can enable a developer to determine what application program of the application programs 108 is running, to inform what application program 108 is hosting the extension 116, a version of the extension 116, and/or to access application-specific logic of the extension 116. The APIs 114 support at least two approaches to access the file 110 contents. In particular, the APIs 114 support a selection-based access approach using a getSelectedDataAsync method, a documentSelectionChanged event, and/or a setSelectedDataAsync method. This can be achieved from the document object. Thus, the APIs 114 can support identifying a section 112 of the file 110 based upon a selection. The APIs 114 also support binding-based access through a binding object. As will be explained in more detail below, bindings can be created in a number of ways including, but not limited to, creating a binding from a current selection, prompting a user to make a selection, and/or by specifying a named object in a document. The selection-based and binding-based access approaches are discussed in more detail below with reference to FIGS. 3-4.

According to some embodiments, the APIs 114 are configured to support the use of common or generic data types across the application programs 108. In particular, the APIs 114 are configured to allow developers to create functionality that is tied to defined data types common across the application programs 108. In one implementation, wherein the application programs 108 correspond to a member of the MICROSOFT OFFICE family of products, the APIs support at least five data types including, but not limited to, a text data type, a matrix data type, a table data type, a Hypertext Markup Language ("HTML") data type, and an Office Open Extensible Markup Language ("OOXML") data type. Other data types including, but not limited to, an image data type, are possible and are contemplated.

According to various embodiments, the text data type includes a string representation of data. A text object can support the text data type. In some embodiments, the format of the data can be obtained by supplying a parameter on the GET* methods, which can have a ValueFormat parameter and can be specified as formatted or unformatted. According to various embodiments, the text object can support plain text, formatted text, and/or other text formats such as HTML or OOXML, if desired. According to some implementations, the matrix data type is configured to return data in a selection. The data returned by the matrix data type can be returned as a jagged array. The table data type can be used to provide data in a selection or binding as a table object. The table object is configured to expose the data through two properties, the headers property and the rows property. By enabling operations on data types that are common or generic across the application programs 108, the APIs 114 can enable developers to create extensions 116 that operate with some, all, or none of the application programs 108. Furthermore, the APIs 114 allow developers to coerce data obtained from the application programs 108 into a recognized data type. As such, the APIs 114 can enable differences in how the various application programs 108 interact with the data to be abstracted away in another manner.

According to various implementations, the APIs 114 support "binding." As used herein, "binding" refers to creating a relationship between the extension 116 and a section 112 of a document or other file 110. A file 110 can include any document being operated on by the application programs 108, as explained above. Thus, the section 112 of the file 110 can include a table within a document, text within a document, a paragraph of a document, an image in a document, or other portion of the file 110. The APIs 114 support binding functionality of the extension 116 to the section 112 of the file 110. As such, the functionality of the extension 116 can be used with more than one of the application programs 108, even if the application programs 108 include programs with varied functionality such as spreadsheet programs, presentation programs, word processing programs, email programs, and the like.

The concept of binding is used by the APIs 114 to enable the extensions 116 to recognize the section 112 of the file 110 based upon a current selection within the document, by an identifier or name assigned to the section 112, by prompting a user to identify the section 112, or using other functionality. Operations can be performed on the section 112, without regard to which of the application programs 108 is in use. As such, the APIs 114 support operations on various types of files 110 and/or sections 112 thereof, across application programs 108, across platforms, and/or across versions. The APIs 114 also support synchronous and asynchronous calls, and can be configured to support interactions with custom extensible markup language ("XML") parts. These and other aspects of the APIs 114 are described in more detail below.

Additionally, the concept of binding can be used to execute various operations with respect to bound document portions such as the section 112 of the files 110 based upon various binding events including, among others, selection of a bound section, determining that a bound selection or bound data has changed, for example using the bindingSelectionChanged or bindingDataChanged events, and/or other events and/or methods. The concept of bindings also can be used prompt execution of logic when data is entered into, selected, or copied from a bound section, when a bound section is accessed, referenced, or written to, and/or upon other occurrences. Some illustrative embodiments of the concept of bindings are set forth below, particularly with reference to FIGS. 4-5. It should be understood that these embodiments are illustrative, and should not be construed as being limiting in any way.

FIG. 1 illustrates one computing device 102, one network 104, and one set of APIs 114 exposed by the application programs 108. It should be understood from the above description, however, that some implementations of the operating environment 100 include multiple computing devices 102, multiple networks 104, a single API 114, and/or multiple sets of APIs 114. Thus, the illustrated embodiments should be understood as being illustrative, and should not be construed as being limiting in any way.

Figure 2:
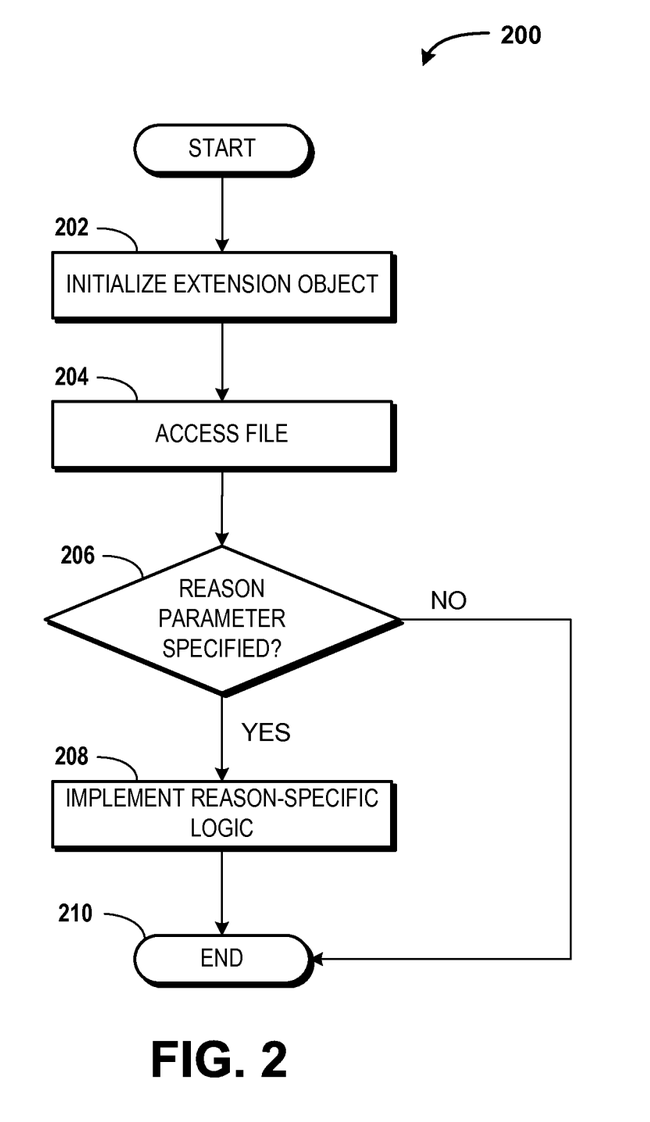
FIG. 2 is a flow diagram showing aspects of a method for initializing a web extension using a cross-platform API, according to an illustrative embodiment.

Turning now to FIG. 2, aspects of a method 200 for initializing a web extension using a cross-platform API will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the computing device 102. In particular, the methods are described as being performed by the computing device 102 via execution of the application programs 108. As explained above, the application programs 108 are configured to expose the APIs 114 to provide the functionality described herein. It should be understood that these embodiments are illustrative, and should not be viewed as being limiting in any way.

The method 200 begins at operation 202, wherein the computing device 102 initializes an extension object. The extension object is configured to enable developers to implement an initialize delegate. In some embodiments, the initialize delegate is defined in a JAVASCRIPT file and gives access to an Context object. Via the Context object, developers and/or extensions 116 can access an object model of the application programs 108.

From operation 202, the method 200 proceeds to operation 204, wherein the computing device 102 accesses a file 110 being interacted with by the application programs 108. As explained above, the file 110 can include any type of document including, but not limited to, word processing documents, spreadsheet documents, databases, presentation documents, email inboxes, messages, folders, and/or other data, calendar objects and/or events, notes, journal entries, contacts, combinations thereof, and the like. The file 110 can be any document being created, used, consumed, saved, modified, or otherwise being interacted with using the application programs 108.

In some embodiments, developers gain access to the contents of the file 110 using the Document object on the Context object accessed in operation 202. In one contemplated embodiment, the functionality disclosed in operations 202-204 can be obtained via execution of a block of JAVASCRIPT code. One example of code for providing this functionality is shown below in Table 1. It should be understood that this embodiment is illustrative, and should not be construed as being limiting in any way.

TABLE 1

```
<script type="text/javascript" src="MicrosoftAjax.js"></script>
<script type="text/javascript" src="Office.js"></script>
<script type="text/javascript">
var __OM;
Office.initialize = function (reason) {
    // Initalize the instance variable for the OM.
    __OM = Office.context.document;
} </script>
```

From operation 204, the method 200 proceeds to operation 206, wherein the computing device 102 determines if a reason parameter is specified. According to various embodiments, the Initialize delegate receives the reason for the initialization. In particular, some embodiments of the initialize function include a reason parameter that specifies a reason for initializing the extension 116. In some embodiments, for example, the extension 116 can be initialized because a user has inserted the extension 116 into a file 110 from a client ribbon or other menu. In other embodiments, the extension 116 can be initialized because a document or other file 110 opened by the application program 108 includes the extension 116. The developer can create reason-specific logic to be executed based upon a reason for which the extension 116 is initialized. In some embodiments, another initialization type is supported in which an extension 116 is contextually activated. In this embodiment, an extension 116 can be activated when certain document properties or other contextual properties exist. It should be understood that this embodiment is illustrative, and should not be construed as being limiting in any way.

If the computing device 102 determines, in operation 206, that a reason parameter is specified, the method 200 proceeds to operation 208, wherein the computing device 102 implements reason-specific logic based upon the reason parameter. In some embodiments, the reason-specific logic includes a first type of functionality when the extension 116 is first inserted into the file 110 and a second type of functionality when the extension 116 is activated. It should be understood that this embodiment is illustrative, and should not be construed as being limiting in any way. From operation 208, or from operation 206 if the computing device 102 determines that a reason parameter is not specified, the method 200 proceeds to operation 210. The method 200 ends at operation 210.

Although not described above in detail, the APIs 114 can include an extension class that includes an initialize event, an Context object that includes properties for getting an application (application{get}:Application), a document (document{get}:Document), a document container (documentContainer{get}:DocumentContainer), and settings (settings{get}:Settings). The APIs 114 also can include an Initialize delegate (context:Initialize) for specifying context of the initialized extension. As mentioned above, the Reason parameter can specify at least if the extension 116 is initialized by being inserted into the file 110 (inserted) or because the extension was already on the file when the document was opened, among other aspects of the context in which the extension 116 is used or initialized. It should be understood that these embodiments are illustrative, and should not be construed as being limiting in any way.

According to some implementations, a document object returned by the Document property behaves differently for content, compared to taskpane extensions. In particular, for content extensions the document object is never null and never changes for a given run-time instance of the extension 116. For taskpane extensions, the document object can be null if the host application program 108 has no file 110 open. A particular taskpane extension can only have affinity to one file 110 at a time. The taskpane extension lifetime can be bound to a lifetime of an application window associated with an application program 108. Thus, when a file 110 is closed, the taskpane extension can remain active if the application window remains open.

Via the initialization function, developers also can access an application object that represents an application program 108 in use at a given time. For example, the application object can provide name and version properties, which can be used by developers to identify the application program 108 that is hosting the extension 116. In one contemplated embodiment, the application object includes an abstract class that includes properties for locale data (1displayLanguage{get}:string), locale UI (contentLanguage{get}:string), mode (mode{get}: ApplicationMode), name (name{get}:string), and version (version{get}:string). The ApplicationMode can include, among others, WebEditor, WebViewer, and Client. It should be understood that this embodiment is illustrative, and should not be construed as being limiting in any way.

As explained above, the document object can enable developers to access contents of a document or other file 110. In one implementation, developers can access the document contents using a selection-based access mode or a binding-based access mode. The selection-based and binding-based access modes are illustrated and described below, respectively, with reference to FIGS. 3 and 4. As mentioned above with reference to FIG. 1, the APIs 114 also support consistent data access across the application programs 108 by enabling consistent data types and by coercing data into one of the recognized data types.

According to one implementation, the APIs 114 support a text data type, a matrix data type, and a table data type, among others. In a binding-based data access approach, contents of the file 110 can be exposed through data types that are common across the application programs 108. The text data type can include a string representation of the data in the binding. According to various implementations, the text type is simply a string type in JAVASCRIPT. Furthermore, the format of the text can be specified as a parameter (ValueFormat) in the GET* and SET* operations. Contemplated data formats include, but are not limited to, plain text, formatted text, HTML, and XML such as, for example, Office Open XML. The matrix data type can be used to provide data in a selection or binding in a tabular format. In one embodiment, the matrix data type is provided by a native jagged JAVASCRIPT Array, though this is not necessarily the case. The table data type can be used to provide data in the selection or binding as a table object. The table object can expose the data through the Headers property (headers{get}:Array) and/or a Rows property (rows{get}:Array), if desired. It should be understood that these embodiments are illustrative, and should not be construed as being limiting in any way.

"Data coercion," as used herein, refers to reshaping or coercing data into a supported or recognized data type. For example, if a paragraph of a word processing document is selected, the APIs 114 support reading the selected data as plain text, as HTML text, Office Open XML, or as a table. Thus, the APIs 114 can be configured to transform data and/or convert data from or into one of the recognized data types for other operations.

Figure 3:
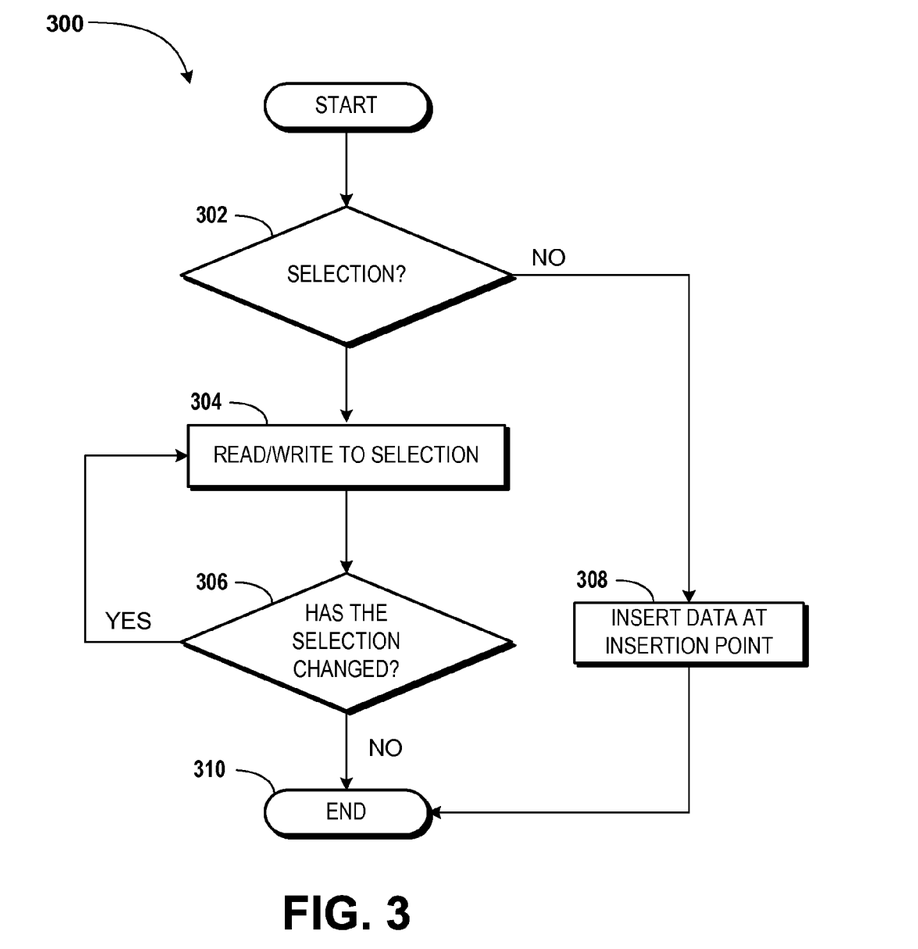
FIG. 3 is a flow diagram showing aspects of a method for performing operations using a selection-based access approach enabled by a cross-platform API, according to an illustrative embodiment.

Turning now to FIG. 3, a method 300 for performing operations using a selection-based access approach enabled by a cross-platform API is illustrated, according to an illustrative embodiment. The method 300 begins at operation 302, wherein the computing device 102 determines if a selection within the application programs 108 is detected. If the computing device 102 determines, in operation 302, that a selection within the document is detected, the method 300 proceeds to operation 302, wherein the computing device 102 reads or writes to the detected selection. One example of code for reading a selection is shown below in Table 2. Two examples of code for writing to a selection are shown below in Tables 3 and 4, for writing a text string and an array, respectively. It should be understood that these embodiments are illustrative, and should not be construed as being limiting in any way.

TABLE 2

```
var __OM;
var __coerceType = "text";
    // Initalize the instance variable for the OM.
Office.initialize = function (reason) {
    __OM = Office.context.document;
}
function alertSelection( ) {
    __OM.getSelectedDataAsync(
        __coerceType, {                    // coercionType
        valueFormat : 'unformatted',       // valueFormat
        filterType:'all'}                  // filterType
        function(asyncResult) {            // callback
    alert((asyncResult.value));
        },
            );
}
```

TABLE 3

```
var __OM;
var __coerceType = "text";
    // Initalize the instance variable for the OM.
Office.initialize = function (reason) {
    __OM = Office.context.document;
}
function setSelection(str) {
    __OM.setSelectedDataAsync(
        str,                               // data
    function(asyncResult) {                // callback
        if(asyncResult.status( ) == "failed")
            alert(asyncResult.status);
        },
            );
}
```

TABLE 4

```
function setSelectionArray( ) {
    var myArray = [ ["one", "two", "three"], ["four", "five",
"six"],
        ["seven", "eight", "nine"] ]
    __OM.setSelectedDataAsync(
        myArray,                           // data
        function(asyncResult) {            // callback
            if(asyncResult.status == "failed")
                alert(asyncResult.status);
        },
            );
}
```

From operation 304, the method 300 proceeds to operation 306, wherein the computing device 102 determines if the selection detected in operation 302 has changed. If the computing device 102 determines, in operation 306 that the selection has changed, the method 300 can return to operation 304. If the computing device determines, in operation 302, that a selection is not detected, the method 300 proceeds to operation 308. In operation 308, the computing device 102 can insert data at an insertion point in the file 110. From operations 306 or 308, the method 300 proceeds to operation 310. The method 300 ends at operation 310.

Figure 4:
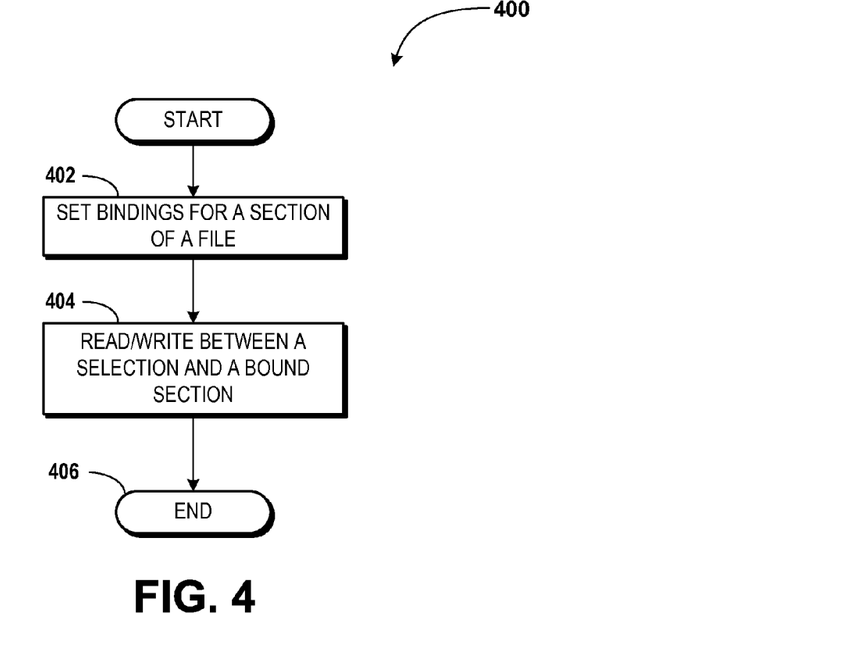
FIG. 4 is a flow diagram showing aspects of a method for performing operations using a binding-based access approach enabled by a cross-platform API, according to an illustrative embodiment.

Turning now to FIG. 4, a method 400 for performing operations using a binding-based access approach enabled by a cross-platform API is illustrated, according to an illustrative embodiment. A binding-based access approach as disclosed herein enables extensions 116 to consistently access a particular section 112 of a file 110 through use of an identifier. The method 400 begins at operation 402, wherein the computing device 102 sets bindings for a section or portion of the document. According to various embodiments, the extension 116 establishes or sets bindings for a section 112 of a file 110 by calling the APIs 114 to associate a selected portion of the file 110 with a unique identifier. Any unique identifier can be used for associating sections 112 of a file with a binding.

The established or set binding can be used to access data in the associated section 112 of the file 110, also referred to herein as a "binding." The concept of bindings disclosed herein also enables developers to subscribe to data and selection change events associated with a particular section 112 of the file 110. As such, an extension 116 can be informed if changes occur in a file 110 in the bound section 112, as opposed to only recognizing changes made to an entire file 110.

According to various embodiments, the document object exposes a Bindings object (bindings{get}:Bindings) that gives access to a collection of bindings associated with a file 110. The developer can create new bindings and/or remove existing bindings. In some implementations, the APIs 114 support at least three types of bindings that can be determined by a type property (type{get}:BindingType). The types of bindings can include, but are not necessarily limited to, a matrix binding type, a text binding type, and a table binding type.

The matrix binding type enables binding to a section 112 of a file 110 that includes tabular data without headers. For example, in MS EXCEL or a table in any other application of the MS Office Software Suite, any contiguous selection of cells can be used to establish a matrix binding. It should be understood that this embodiment is illustrative, and should not be construed as being limiting in any way. The table binding type enables binding a section 112 of a file 110 that contains a table with headers. For example, any table within an MS EXCEL spreadsheet or an MS WORD document can be the basis of a table binding. A text binding enables binding to a section 112 of a file 110 that can be represented as text. For example, in MS WORD, most contiguous selections of text can be the basis of a text binding. In MS EXCEL, a single cell selection can be the basis of a text binding. It should be understood that these embodiments are illustrative, and should not be construed as being limiting in any way.

One example of code for creating a binding for a selection is provided below in Table 5. It should be understood that this embodiment is illustrative, and should not be construed as being limiting in any way.

TABLE 5

```
var _OM;
var _bindingType = 'text';
    // Initalize the instance variable for the OM.
Office.initialize = function (reason) {
    _OM = context.document;
}
function bindSelection(id) {
    _OM.bindings.addFromSelectionAsync(
        _bindingType,              // bindingType
        {id:'id'},                 // id (optional)
        function(asyncResult) {    // callback
            alert(asyncResult.status); },
        );
}
```

From operation 402, the method 400 proceeds to operation 404, wherein the computing device 102 reads or writes to the bound section 112, for example, a binding set in operation 402 as being associated with a particular section 112. In some embodiments, data within a current selection within a file 110 can be written to a bound section 112. The data within the bound section 112 also can be written to a current selection in the file 110, if desired. One example of code for writing to a bound section from a current selection is provided below in Table 6. The Office.select( ) object enables developers to reference bindings in an easy manner. It should be understood that these embodiments are illustrative, and should not be construed as being limiting in any way.

TABLE 6

```
Office.select("bindings#id").setDataAsync(myData,
    function(result){
        window.alert(result.status)
    });
```

From operation 404, the method 400 proceeds to operation 406. The method 400 ends at operation 406.

Although not explicitly shown above in FIGS. 1-4, some embodiments of the APIs 114 are configured to support specifying a binding via selection of content using a user interface. For example, users can select, via a user interface, a portion of content such as a section 112 of a file 110, a table, a string of text, or the like. The user also can specify the selection made via the user interface as a binding for use by the extension 116. Thus, it should be understood that bindings as disclosed herein can be explicitly created by users via user interfaces or via other functionality, if desired.

Figure 5:
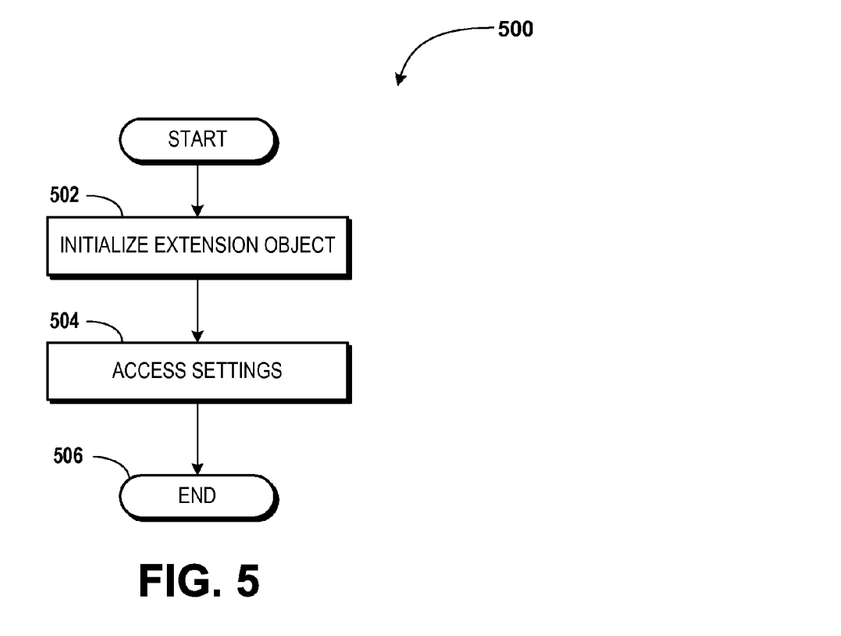
FIG. 5 is a flow diagram showing aspects of a method for persisting settings enabled by a cross-platform API, according to an illustrative embodiment.

Turning now to FIG. 5, a method 500 for persisting settings enabled by a cross-platform API is illustrated, according to an illustrative embodiment. According to various embodiments, the concepts and technologies disclosed herein enable developers to persist document-level settings for extensions 116. A settings object can be loaded as part of the Context object discussed above with reference to FIG. 2. As such, the settings object can be available when an extension 116 is activated. A developer can access the settings object using the Settings object within the Context object. The Settings object can include a get method (get(string settingName):object), a remove setting method (remove(string settingName):void), an asynchronous save settings method (saveAsync(AsyncCallback callback, bool overwriteIfStale):void), and a set settings method (set(object setting, object value):void). The settings object also can include a delegate for recognizing changed settings (settingsChanged:SettingsChangeHandler). Recognizing changed settings can be particularly useful in co-authoring scenarios where two users or developers may be modifying a document at a particular time. While an asynchronous save settings method is described above, it should be understood that the APIs 114 also can support synchronous operations, if desired.

The method 500 begins at operation 502, wherein the computing device 102 initializes the extension object. The functionality of operation 502 can be, but is not necessarily, substantially similar to the functionality of operation 202. From operation 502, the method 500 proceeds to operation 504, wherein the computing device 102 accesses settings associated with the extension 116. One example of code for accessing settings of an extension 116 is set forth below in Table 7. It should be understood that this embodiment is illustrative, and should not be construed as being limiting in any way.

TABLE 7

```
<script type="text/javascript" src="MicrosoftAjax.js"></script>
<script type="text/javascript" src="Office.js"></script>
<script type="text/javascript">
var _OM;
var _settings;
Office.initialize = function (reason) {
```

TABLE 7-continued

```
    // Initalize the instance variable for the OM.
    _OM = context.document;
    // Initalize the instance variable for the Settings object.
    _settings = context.settings;
}
</script>
```

While the above description has discussed various embodiments of the APIs 114 that can be used to effectively abstract away changes between various application programs 108, it should be understood that this functionality can be used to compliment dedicated APIs and/or object models associated with the various application programs 108. In particular, some embodiments of the concepts and technologies disclosed herein allow use of dedicated APIs associated with the various application programs 108 in addition to, or instead of, interacting with the application programs 108 via the APIs 114 that support cross-platform operations as disclosed herein.

While the above description has discussed selections and bindings within the files 110 as referring to a selection within a particular instance of the application programs 108, it should be understood that the APIs 114 also can support multiple users and multiple interactions. As such, a current selection or a binding can be defined based upon a number of users and/or a number of instances of the application programs 108. In one contemplated embodiment, the APIs 114 support operations on a portion of a co-authored document, wherein the portion corresponds to a part of a file 110 that a largest number of co-authors are currently working. It should be understood that this embodiment is illustrative, and should not be construed as being limiting in any way.

It can be appreciated from the above description, that embodiments of the APIs 114 can enable a consistent programming model for extending and customizing a range of software program types using a single set of APIs 114. As such, various application programs 108 having different and/or specialized functionality can be interacted with, accessed, and/or controlled using a single set of APIs 114. Such embodiments contract with traditional APIs for such application programs 108, for example, varied APIs and/or different object models that traditionally are used to access, interact with, and/or control varied software programs. Thus, various embodiments of the APIs 114 disclosed herein provide common data types and support bindings to abstract differences and allow extensions for various application programs 108 using a single code base.

The APIs 114 also can be designed to support efficient and symmetric execution across various computing environments and/or platforms, including, but not limited to, platforms having different run-time characteristics such as stand-alone PC applications, client-server applications, mobile applications, other applications, and the like. The APIs 114 can use asynchronous execution patters to allow for non-intrusive programmability that can impose minimal impact to the normal execution of the software program being extended.

The APIs 114 also are configured to be resilient and/or resistant to changes made to the underlying software program. Thus, extensions and/or other add-ons may continue functioning across various versions of the application programs 108 without requiring re-coding and the like. In some embodiments, this feature is enabled by not directly exposing functionality and implementation of the software programs. Thus, the APIs 114 allow for software programs to be versioned or improved without requiring the APIs 114 to be changed or adapted for each modification.

The APIs 114 also can be configured such that only portions needed for a particular software program are loaded into memory and/or over the network 104. Thus, various embodiments of the APIs 114 can ensure that computing and network resources can be efficiently and effectively used. This resource management capability of the APIs 114 can be transparent to the developer. Additionally, as mentioned above, the APIs 114 can include generic functionality for controlling multiple application programs 108 and specific functionality for controlling a particular application program 108. Thus, developers can be given the flexibility to choose between generic codebases and specialized codebases.

The APIs 114 also can include and/or support interactions with a user profile API. The user profile API can allow access to various information that can be used, alone or in conjunction with the APIs 114 disclosed herein to enable functionality across the application programs 108. The user profile API can allow access to user information such as, for example, an email address associated with a user interacting with the program; a display name and/or real name of the user; a time zone within which the user is working; a unique identifier associated with the user and/or machine used to work with the program; a network or physical location (GPS location, IP address, etc.) associated with the user or machine used to access the program; a language and/or culture associated with the user or machine; authentication information such as a unique identifier, password, userID, token, or other information; and/or other information associated with the user or machine used to access the program. Because the APIs 114 can access these and other APIs, extensions 116 that make use of detailed user information and/or other information accessible via various APIs can be used to develop cross-platform extensions 116. It should be understood that this embodiment is illustrative, and should not be construed as being limiting in any way.

In another embodiment, the APIs 114 include an entity-recognition API for checking a binding or selection for a recognized entity. The entity can include a business, a user, an address, a telephone number, or other data that can be recognized as being associated with, or being, an entity. This entity-recognition API can also be accessed by an extension 116 to create cross-platform extensions 116 that recognize entities within bindings or other sections or portions of information. It should be understood that this embodiment is illustrative, and should not be construed as being limiting in any way.

In yet another contemplated embodiment, the APIs 114 can include an information-sharing API. The information-sharing API can be exposed for indicating if a user, application, or API enables or allows access to partner or entity information sharing features. Partner or entity information sharing features can allow applications and/or users to access various types of information associated with entities if authorized by users, applications, or other entities. These and other functionality associated with the information-sharing API can be selectively enabled or disabled by users to address perceived privacy concerns. It should be understood that this embodiment is illustrative, and should not be construed as being limiting in any way.

By way of example, an extension 116 can be configured to access the entity-recognition API and the information-sharing API to search a binding to determine if any entities are recognized. If an entity such as a person, company, or other entity is recognized, the extension 116 can use the information-sharing API to determine if the application within which the binding is located, or a user associated therewith, authorizes information-sharing features. If so, the extension 116 can access additional information associated with the recognized entity. It should be appreciated that in the above example, the user profile API also can be accessed to determine if a user profile allows the sharing of information as provided in the example above. It should be understood that this example is illustrative, and should not be construed as being limiting in any way.

As explained above, the APIs 114 described herein also can interact with application-specific APIs to support and/or enable extensions 116 that the cross-platform features described herein and/or make use of application-specific functionality. By using a combination of cross-platform and application-specific APIs, powerful applications and/or extensions 116 can be crafted. In one contemplated embodiment, the APIs 114 can be used in conjunction with an application-specific API exposed by a member of the MICROSOFT OUTLOOK family of products from Microsoft Corporation in Redmond, Wash. Because many other contemplated application-specific APIs are contemplated with regard to many different applications including, but not limited to, the application programs 108, it should be understood that this embodiment is illustrative, and should not be construed as being limiting in any way.

In one example, the member of the MICROSOFT OUTLOOK family of products exposes an OUTLOOK object API that allows access to information and/or content associated with OUTLOOK objects such as information associated with a mail item, information associated with events or appointments, information associated with contacts, information associated with tasks, and the like. In one example, mail item information including, but not limited to, information from message headers or contents such as the TO, FROM, and SUBJECT lines, as well as message contents, signatures, or certificates can be accessed via the OUTLOOK object API. It should be understood that this example is illustrative and should not be construed as being limiting in any way.

In another example of an application-specific API, a member of the MICROSOFT EXCEL family of products can expose an EXCEL object API that allows access to information and/or content associated with EXCEL objects. The EXCEL objects can include, for example, one or more, or a range of, cells within a workbook or spreadsheet; a spreadsheet; a graph or other representation; a pivot table within a spreadsheet or workbook; other objects; combinations thereof; or the like. It should be understood that this embodiment is illustrative, and should not be construed as being limiting in any way.

Figure 6:
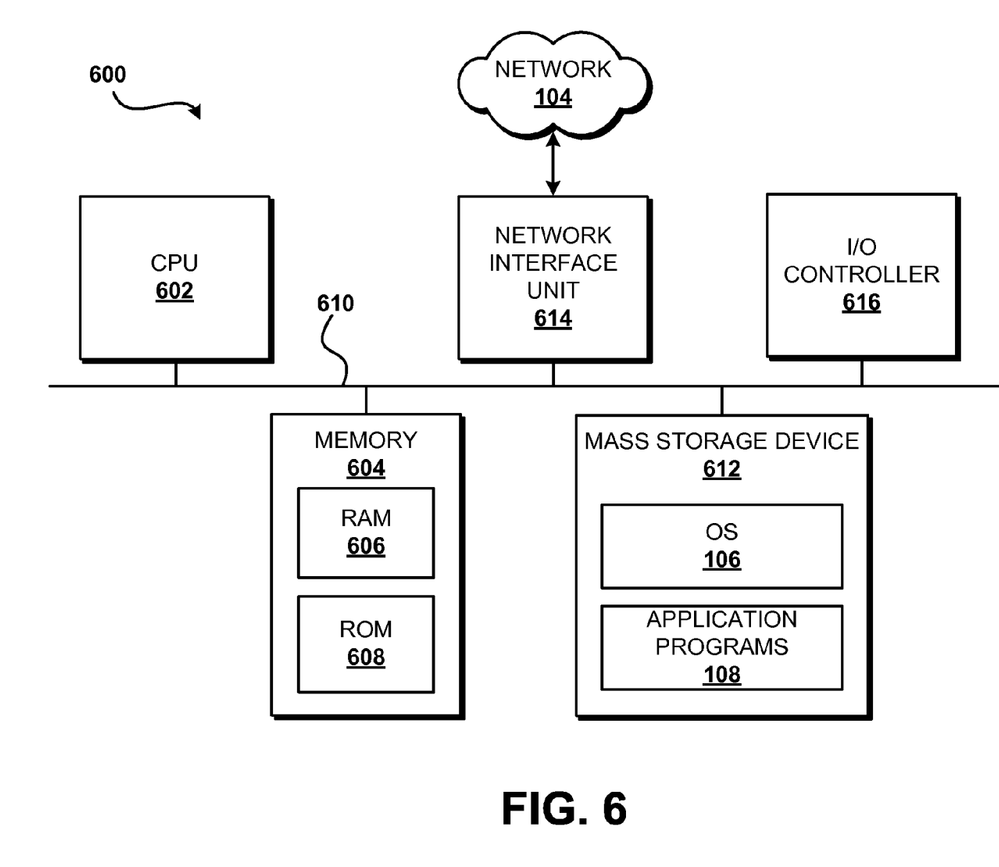
FIG. 6 is a computer architecture diagram illustrating an illustrative computer hardware and software architecture for a computing system capable of implementing aspects of the embodiments presented herein.

FIG. 6 illustrates an illustrative computer architecture 600 for a device capable of executing the software components described herein for providing cross-platform APIs for applications. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 106 and the application programs 108. Although not shown in FIG. 6, the mass storage device 612 also can be configured to store the extension 116, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium" and variations thereof, does not include waves, signals, and/or other transitory and/or intangible communication media, per se.

According to various embodiments, the computer architecture 600 may operate in a networked environment using logical connections to remote computers through a network such as the network 104. The computer architecture 600 may connect to the network 104 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for cross-platform application programming interfaces for applications have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method comprising:
   initializing an extension object configured to supplement functionality of the application program, the application program comprising one of a plurality of application programs configured to expose a set of application programming interfaces;
   accessing, via the application programming interfaces, a file with which the application program interacts;
   identifying a section of the file as a generic data type that is applicable to individual ones of the plurality of application programs; and
   performing an operation on the section by presenting a user interface for selecting a portion of the file, wherein the user interface is configured to allow a user to select the portion of the file and to return the selected portion of the file to the extension object for use as a binding.

2. The method of claim 1, wherein performing the operation on the section comprises:
   determining if the portion of the file is selected; and
   in response to determining that the portion of the file is selected, reading data from the portion of the file selected.

3. The method of claim 1, wherein performing the operation on the section comprises:
   determining if the portion of the file is selected;
   in response to determining that the portion of the file is selected, writing data to the portion of the filed selected; and
   in response to determining that the portion of the file is not selected, inserting the data at an insertion point within the file.

4. The method of claim 1, further comprising:
   setting the binding for the section of the file, the binding comprising data identifying a bound section of the file;
   determining if the portion of the file is selected; and
   in response to determining that the portion of the file is selected, writing at least one of
   portion data from the portion to the to the bound section, or
   bound section data from the bound section to the portion.

5. The method of claim 1, wherein initializing the extension object further comprises initializing a settings object for obtaining settings associated with the extension object and implementing the settings during initialization of the extension object.

6. The method of claim 1, wherein performing the operation further comprises determining a data type of data within the section, the data type comprising at least one of a text data type, a matrix data type, or a table data type.

7. The method of claim 1, wherein performing the operation further comprises determining a data type of data within the section, the data type comprising a matrix data type and performing the operation on the data in the matrix data type, the matrix data type comprising a programming language array object.

8. The method of claim 1, wherein initializing the extension object comprises implementing an initialize delegate defined in a programming language file, wherein the initialize delegate comprises a reason parameter for defining a context in which the extension is initialized, and wherein the context comprises at least one of inserting the extension into the file or activating the extension.

9. The method of claim 1, further comprising:
accessing an application-specific application programming interface to obtain data from at least one of the application programs, and
performing the operation via the application programming interfaces and the application-specific application programming interface, wherein the at least one of the application programming interfaces or the application-specific application programming interface comprises a user profile application programming interface.

10. A computer storage medium having computer readable instructions stored thereupon that, when executed by a computer, cause the computer to:
execute an application program of a plurality of application programs configured to expose a set of application programming interfaces for interacting with a file associated with the application program;
initialize, via the set of application programming interfaces, an extension object for supplementing functionality of the application program;
identify a section of the file, the section being identified as a generic data type that is applicable to individual ones of the plurality of application programs;
access the section via the set of application programming interface interfaces; and
perform an operation on the section by presenting a user interface for selecting a portion of the file, wherein the user interface is configured to allow a user to select the portion of the file and to return the selected portion of the file to the extension object for use as a binding.

11. The computer storage medium of claim 10, wherein performing the operation on the section comprises:
determining if the portion of the file is selected;
in response to determining that the portion of the file is selected, at least one of
reading data from the selection, or
writing data to the selection; and
in response to determining that the portion of the file is not selected, inserting the data at an insertion point within the file.

12. The computer storage medium of claim 10, further comprising computer readable instructions that, when executed by the computer, cause the computer to:
set the binding for the section of the file, the binding comprising data identifying a bound section of the file;
determine if the portion of the file is selected; and
in response to determining that the portion of the file is selected, writing at least one of
portion data from the portion to the bound section, or
bound section data from the bound section to the portion.

13. The computer storage medium of claim 10, wherein performing the operation further comprises determining a data type of data within the section, the data type comprising at least one of a text data type, a matrix data type, or a table data type.

14. The computer storage medium of claim 10, wherein initializing the extension object comprises implementing an initialize delegate defined in a programming language file, and wherein the initialize delegate comprises a reason parameter for defining a context in which the extension object is initialized, and wherein initializing the extension object further comprises initializing a settings object for obtaining settings associated with the extension object and implementing the settings during initialization of the extension object.

15. A computer, comprising:
a processor; and
a computer-readable storage medium in communication with the processor, the computer-readable storage medium having computer readable instructions stored thereupon that, when executed by the processor, cause the processor to
execute a plurality of application programs configured to expose a set of programming language application programming interfaces for interacting with the plurality of application programs and for interacting with a file associated with at least one of the plurality of application programs,
initialize, via the set application programming language interfaces, an extension object for supplementing functionality of the plurality of application programs by implementing an initialize delegate defined in a programming language file, the initialize delegate comprising a reason parameter for defining a context in which the extension object is initialized,
access, via the set of application programming language interfaces, a section of the file the one of the plurality of application programs interacts with,
identify the section of the file as a generic data type that is applicable to individual ones of the plurality of application programs, and
perform an operation on the section by presenting a user interface for selecting a portion of the file, wherein the user interface is configured to allow a user to select the portion of the file and to return the selected portion of the file to the extension object for use as a binding.

16. The computer of claim 15, wherein performing the operation comprises:
determining if the portion of the file is selected;
in response to determining that the portion of the file is selected, at least one of
reading data from the selection, or
writing data to the selection; and
in response to determining that the portion of the file is not selected, inserting the data at an insertion point within the file.

17. The computer of claim 15, further comprising computer readable instructions that, when executed by the processor, cause the processor to:
set the binding for the section of the file, the binding comprising data identifying a bound section of the file;
determine if a portion of the file is selected; and
in response to determining that the portion of the file is selected, writing at least one of
portion data from the portion to the to the bound section, or
bound section data from the bound section to the portion.

18. The computer of claim 15, wherein initializing the extension object further comprises initializing a settings object for obtaining settings associated with the extension object and implementing the settings during initialization of the extension object.

* * * * *